United States Patent
Chou

(10) Patent No.: US 12,518,036 B2
(45) Date of Patent: Jan. 6, 2026

(54) SYSTEM FOR DECENTRALIZED IDENTIFICATION OF FILE ACCESS PERMISSION

(71) Applicants: Eric Sung-Chun Chou, Taipei (TW); Snowbridge Inc., Taipei City (TW)

(72) Inventor: Eric Sung-Chun Chou, Taipei (TW)

(73) Assignees: ERIC SUNG-CHUN CHOU, Taipei (TW); SNOWBRIDGE INC., Taipei (TW)

( * ) Notice: Subject to any disclaimer, the term of this patent is extended or adjusted under 35 U.S.C. 154(b) by 15 days.

(21) Appl. No.: 18/790,017

(22) Filed: Jul. 31, 2024

(65) Prior Publication Data

US 2025/0053672 A1 Feb. 13, 2025

(30) Foreign Application Priority Data

Aug. 7, 2023 (TW) ................................. 112208321

(51) Int. Cl.
*G06F 21/62* (2013.01)
*H04L 9/32* (2006.01)
*H04L 9/40* (2022.01)

(52) U.S. Cl.
CPC .......... *G06F 21/6209* (2013.01); *G06F 21/62* (2013.01); *H04L 9/3247* (2013.01); *H04L 63/0442* (2013.01)

(58) Field of Classification Search
CPC .................................................. G06F 21/6209
See application file for complete search history.

(56) References Cited

U.S. PATENT DOCUMENTS

| | | | |
|---|---|---|---|
| 2010/0138922 A1* | 6/2010 | Zaifman | G06F 21/6218 707/E17.014 |
| 2021/0243201 A1* | 8/2021 | Tandel | H04L 9/0897 |
| 2021/0250353 A1* | 8/2021 | Todd | H04L 63/126 |
| 2023/0316261 A1* | 10/2023 | Agbamu | G06N 3/09 705/67 |

* cited by examiner

*Primary Examiner* — Bradley W Holder
(74) *Attorney, Agent, or Firm* — Birch, Stewart, Kolasch & Birch, LLP

(57) ABSTRACT

A system for decentralized identification of a file access permission includes a front-end program and an access control server. The front-end program includes at least one credential. The front-end program extracts attribute data of a corresponding access condition and a definition file identifier (ID) of the credential from the credential based on a check rule message related to a specified file, to form a multi-credential proof file. The access control server obtains an issuer decentralized identifier (DID) and a first public key corresponding to the multi-credential proof file by querying a blockchain for all of the credential definition files corresponding to the multi-credential proof file, confirms that each piece of the attribute data in the multi-credential proof file is correct, and all of the attribute data in the multi-credential proof file meets the access condition, and then grants the front-end program an access permission corresponding to the specified file.

20 Claims, 5 Drawing Sheets

SYSTEM FOR DECENTRALIZED IDENTIFICATION OF FILE ACCESS PERMISSION

CROSS-REFERENCE TO RELATED APPLICATION

This non-provisional application claims priority under 35 U.S.C. § 119 (a) to patent application Ser. No. 11/220,8321 filed in Taiwan, R.O.C. on Aug. 7, 2023, the entire contents of which are hereby incorporated by reference.

BACKGROUND

Technical Field

The present disclosure relates to a file access system, and in particular, to a system for decentralized identification of a file access permission.

Related Art

Generally, to prevent files from being accessed by any person, an identity verification mechanism is set up, and a usual manner is using an account for management. A user may access a file in a file system after logging in to the file system using an account and a password of the user.

On the other hand, to avoid arbitrary access to all files in the file system by a person who has the account of the file system, an access permission may be set up for a certain file, and only a user who can present a binding secret to prove the ownership of the account that has a permission can be allowed to access the file.

However, the method of using an account and the binding secret to verify the identity of a user is prone to leakage of the account and the secret. The user may allow another person to know the binding secret and log in the account, or a malicious person may steal the account and the binding secret and impersonate the user. On the other hand, for a manager, all accessible accounts need to be individually set for different files. When a certain user is no longer suitable for accessing the file (such as leaving a job or leaving a project), the permission of the user's account also needs to be revoked, which makes management inconvenient.

SUMMARY

In view of the above, the present disclosure provides a system for decentralized identification of a file access permission, so as to resolve the foregoing problem through credential control.

A system for decentralized identification of a file access permission includes a front-end program and an access control server. The front-end program includes at least one credential. The credential includes an issuer decentralized identifier (DID) and at least one piece of attribute data. The attribute data is electronically signed by an issuer by using a private key paired with a first public key. The access control server is communicatively connected to an external file system and a blockchain. The file system stores at least one file. The access control server includes a storage module, a network interface, and a processor. The processor is coupled to the storage module and the network interface. The storage module stores at least one condition setting file. The condition setting file records at least one access condition. Each file corresponds to one of the access conditions. The network interface is configured to receive an access request that is transmitted by the front-end program and corresponds to a specified file of the least one file. The processor is configured to, in response to the access request, obtain the access condition corresponding to the specified file from the condition setting file, and transmit a check rule message including the access condition to the front-end program through the network interface. The front-end program is configured for extracting the attribute data and the definition file ID corresponding to the access condition from the credential based on the check rule message, to form a multi-credential proof file, and returning the multi-credential proof file to the access control server. The access control server is configured to receive the multi-credential proof file through the network interface, and the processor is configured to query the blockchain for a credential definition file and a first public key corresponding to each of the definition file IDs in the multi-credential proof file through the network interface, so as to confirm, based on each obtained credential definition file and each obtained first public key, that each piece of the attribute data in the multi-credential proof file is correct, confirm that all of the attribute data in the multi-credential proof file meets the access condition, and then grant the front-end program an access permission corresponding to the specified file.

In some embodiments, each piece of the attribute data in the multi-credential proof file is encrypted through a first private key corresponding to the corresponding first public key to generate an electronic signature, and the electronic signature of each piece of the attribute data in the multi-credential proof file is decrypted based on the corresponding first public key to confirm that each piece of the attribute data is correct.

In some embodiments, the credential further includes a user DID. The front-end program further includes a second private key.

In some embodiments, the blockchain further associatively stores the user DID and a second public key corresponding to the second private key.

In some embodiments, the access control server is configured to obtain the corresponding second public key from the blockchain based on the user DID in the credential before transmitting a piece of data to the front-end program, and encrypt the data by using the second public key.

In some embodiments, the credential definition file is written to the blockchain to form a definition file write record, and an electronic signature is executed on the definition file write record through a first private key corresponding to the first public key.

In some embodiments, the access control server is configured to query the blockchain for the credential definition file and the first public key corresponding to each of the definition file IDs in the multi-credential proof file.

In some embodiments, the blockchain further associatively stores an issuer DID and a uniform resource identifier (URI) corresponding to the issuer DID.

In some embodiments, the front-end program generates a master secret value, and the master secret value is subjected to blinded encryption and then added to the credential.

In some embodiments, a manner of confirming whether the access condition is met is using a predicate algorithm of zero-knowledge proofs.

In some embodiments, the file system is an interplanetary file system (IPFS).

In some embodiments, each of the files is encrypted by a randomly generated symmetric key and then stored in the IPFS, and the IPFS stores the encrypted file and correspondingly generates a first content identifier (CID).

In some embodiments, the symmetric key is encrypted by a third public key in a key pair generated through asymmetric encryption and generates symmetric key ciphertext, and the symmetric key ciphertext, the first CID, and a piece of metadata corresponding to the file are written to a file identification file. The IPFS stores the file identification file and correspondingly generates a second CID. After the front-end program obtains the access permission of the specified file, the access control server is configured to query the blockchain for the corresponding second CID based on the descriptive data of the specified file, to obtain the file identification file from the IPFS based on the second CID, and read the first CID, the symmetric key ciphertext, and the metadata from the file identification file. The symmetric key ciphertext is decrypted by a third private key corresponding to the third public key to restore the symmetric key. The access control server is configured to obtain an encrypted specified file from the IPFS based on the first CID read from the file identification file, and decrypt the encrypted specified file by using the restored symmetric key and provide the decrypted specified file to the front-end program.

In some embodiments, the first CID, the symmetric key, and a piece of metadata corresponding to the file are written to a file identification file. The file identification file is encrypted by a third public key in a key pair generated through asymmetric encryption and stored in the IPFS, and the IPFS correspondingly generates a second CID. After the front-end program obtains the access permission of the specified file, the access control server is configured to query the blockchain for the corresponding second CID based on the descriptive data of the specified file, to obtain an encrypted file identification file from the IPFS based on the second CID. The encrypted file identification file is decrypted by a third private key in a corresponding key pair to restore the first CID, the symmetric key, and the metadata. The access control server is configured to obtain an encrypted specified file from the IPFS based on the restored first CID, and decrypt the encrypted specified file by using the restored symmetric key and provide the decrypted specified file to the front-end program.

In some embodiments, the second CID and a piece of descriptive data corresponding to the file are associatively stored in the blockchain.

In some embodiments, the metadata read from the file identification file is provided to the front-end program.

In some embodiments, the metadata includes a file format, a file name, and a timestamp corresponding to the specified file.

Based on the above, according to the system for decentralized identification of a file access permission in some embodiments of the present disclosure, the credential is used to confirm the access permission of the user to avoid a risk of fraudulent use and theft that may be caused by use of an account and a password, and validity of the credential is managed and controlled to facilitate management of the access permission of the user. Since the credential is kept by the user, privacy may be kept, thereby avoiding a risk of exposing personal information caused by storage of the credential in the blockchain, and information cannot be deleted once stored in the blockchain. Therefore, an attribute of the personal information is not shared by the blockchain, but is preserved in a personal/private communication channel of the user. The information stored into the blockchain by the present disclosure is the DID, the public key, and the credential definition file, and disclosure of such information does not involve personal information content of the user. According to another aspect, in some embodiments, the file is encrypted in advance and then stored in the IPFS, so that a problem of lack of encryption protection due to the file in the IPFS being open to a node may be resolved. Moreover, since the file is fragmented when stored in the IPFS, a format of an original file cannot be identified after reorganization and restoration. If the file format is not learned in advance, the file cannot be normally opened. The metadata of the file is stored in the IPFS together, so as to resolve the problem that the file format cannot be identified. In addition, the access control server may encrypt the file with the public key to which the user DID belongs when transmitting the file to the front-end program, to ensure that the file may only be read by an authorized user.

DETAILED DESCRIPTION

Figure 1:
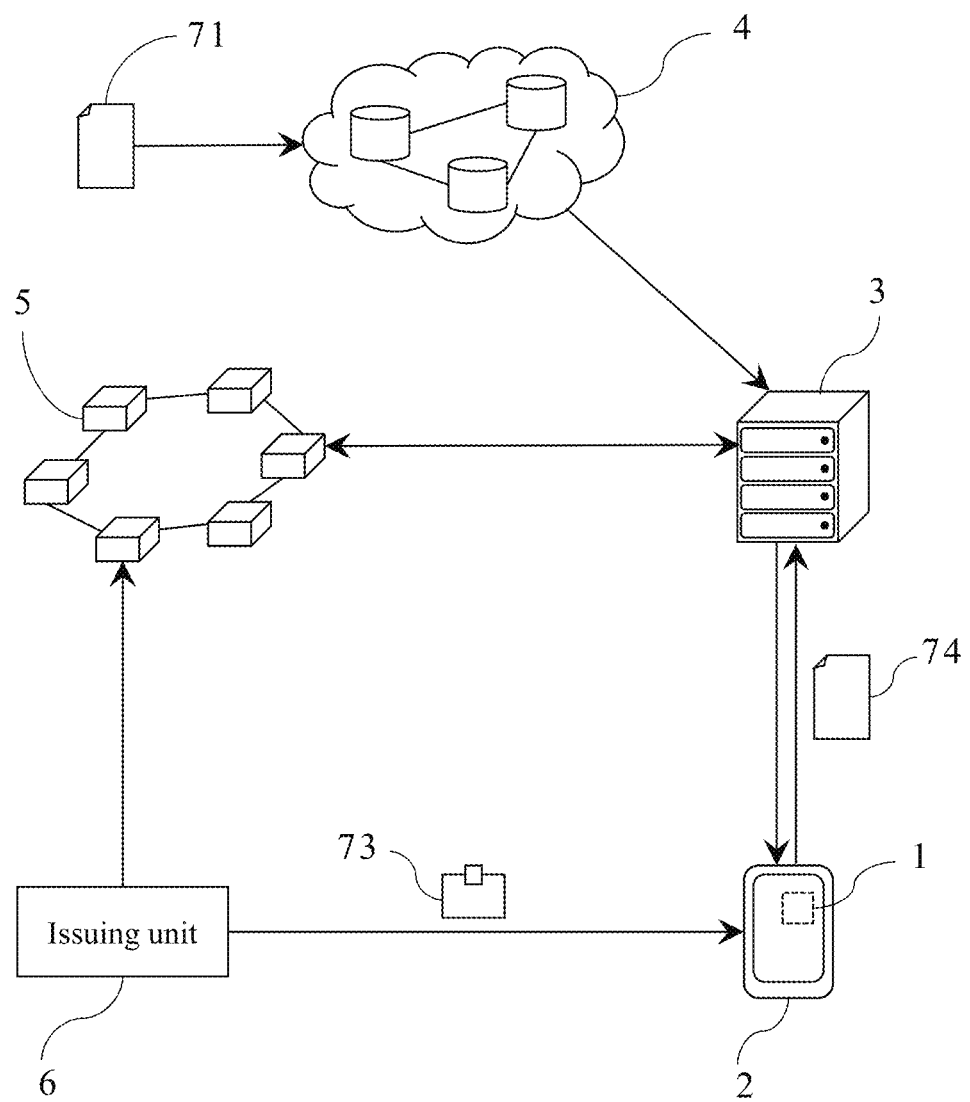
FIG. 1 is a schematic diagram of an architecture of a system for decentralized identification of a file access permission according to an embodiment of the present disclosure.

Referring to FIG. 1, FIG. 1 is a schematic diagram of an architecture of a system for decentralized identification of a file access permission according to an embodiment of the present disclosure. The system includes a front-end program 1 and an access control server 3. The access control server 3 is communicatively connected to a file system 4 and a blockchain 5. The file system 4 stores at least one file 71. The front-end program 1 includes at least one credential 73. The credential 73 is issued by an issuing unit 6. The front-end program 1 is executed by a user device 2. The user device 2 may be an electronic device such as a mobile phone, a notebook computer, and a tablet computer. The electronic device is provided with hardware such as a processor, a memory, and a communication circuit, and may execute the front-end program 1 and communicate with another object (including but not limited to the access control server 3 and the issuing unit 6). The front-end program 1 may be an application program, but the present disclosure is not limited thereto.

Before a manner in which the issuing unit 6 issues the credential 73 is further described, a decentralized identifier (DID) is first described. To give a user full control over data and protect privacy of the data, the world wide web consortium (W3C) has established relevant specifications such as data formats and data types of DIDs. Through the architecture of the DIDs, the data (DID data) whose privacy needs to be protected is kept by an owner and not directly disclosed to the public, and a DID is generated to provide an index, which is similar to a key-value relationship of a database (the DID is a key and the DID data is a value). The DID is an unduplicated identifier string. If a piece of data and another piece of data (or more data) being "associatively stored" is described below, it means that an association relationship is also saved when the data is stored, and another piece of data in the same association relationship can be found based on one piece of the data.

The issuing unit 6 randomly generates one or more DIDs (referred to as "issuer DIDs" below) and a key pair (including a corresponding public key and a corresponding private key, respectively referred to as "a first public key" and "a first private key" below) generated through asymmetric encryption (such as an RSA or an ECDSA). The first private key is stored in the issuing unit 6. The issuer DID and the first public key are associatively stored in the blockchain 5. The blockchain 5 may be searched for the corresponding first public key based on the issuer DID. Since the issuer DID and the first public key are completely de-identified, an identity of an issuer cannot be identified even if the issuer DID is read from the blockchain 5. In some embodiments, a uniform resource identifier (URI) having an access point that describes information of the issuing unit 6 is also stored in the blockchain 5. Herein, the URI and the issuer DID are associatively stored in the blockchain 5, so that a retriever finds the corresponding URI from the blockchain 5 based on the issuer DID, and request the information of the issuing unit 6 from the issuing unit 6 based on the URI.

On a user side, the front-end program 1 randomly generates one or more DIDs (referred to as "user DIDs" below) and a key pair (including a corresponding public key and a corresponding private key, respectively referred to as "a second public key" and "a second private key" below) generated through asymmetric encryption (such as an RSA or an ECDSA). The second private key is stored in the front-end program 1. The user DID and the second public key are associatively stored in the blockchain 5. Since the user DID and the second public key are completely de-identified, an identity of the user cannot be identified even if the user DID is read from the blockchain 5.

In some embodiments, the front-end program 1 randomly generates one or more master secret values exclusive to the user. The master secret values are stored in the front-end program 1. The master secret values are subjected to blinded encryption and then provided to the issuing unit 6 and added to the credential 73. Anyone who obtains blinded master secret values cannot identify the identity of the user, but the blinded master secret values serve as proof of an exclusive relationship between the credential 73 and the user.

When the issuing unit 6 completes identity identification of the user in one or some manners (such as chip card authentication and biometric identification), the front-end program 1 provides the blinded master secret values (if any) and the user DID to the issuing unit 6. The issuing unit 6 selects a credential definition file, enters attribute data of the user into an attribute field in the credential definition file, then encrypts each piece of attribute data (that is, an electronic signature) by using the first private key of the issuing unit 6, to obtain the credential 73, and transmits the credential 73 to the user device 2 and stores the credential 73 in the front-end program 1. The credential 73 includes not only the foregoing attribute data and the electronic signature issued by the issuing unit 6, but also the blinded master secret values (if any), the user DID, and a definition file ID. The definition file ID is a unique serial number of each credential definition file.

The credential definition file is defined in advance by the issuing unit 6 (that is, before the credential 73 is issued) and stored in the blockchain 5. The credential definition file may be edited based on a structure description information file (such as a Schema file). The structure description information file is defined in advance by the issuing unit 6 or another user of the blockchain 5 and stored in the blockchain 5. The structure description information file is defined with one or more attributes. The issuing unit 6 selects all attributes in a structure description information file made by the issuing unit or another issuing unit to form the credential definition file. However, the present disclosure is not limited thereto. In some embodiments, only a part of the attributes in the structure description information file may also be used to form the credential definition file. When the issuing unit 6 writes the credential definition file to the blockchain 5, the electronic signature is executed on a write record (referred to as the "a definition file write record" below) by using the first private key corresponding to the issuer DID. The definition file write record includes contents of the credential definition file. The blockchain 5 provides the credential definition file with a unique definition file ID. The issuing unit 6 needs to select a credential definition file during issuing of the credential 73, and adds the definition file ID of the selected credential definition file to the credential 73.

Figure 2:
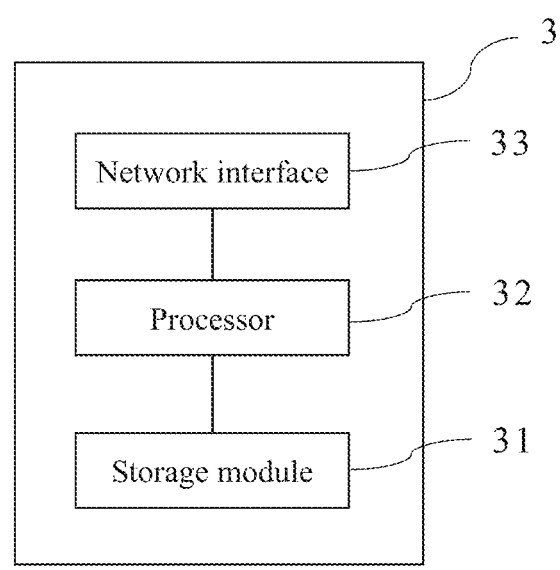
FIG. 2 a schematic diagram of an architecture of an access control server according to an embodiment of the present disclosure.

Referring to FIG. 2, FIG. 2 a schematic diagram of an architecture of an access control server 3 according to an embodiment of the present disclosure. The access control server 3 includes a storage module 31, a processor 32, and a network interface 33. The processor 32 is coupled to the storage module 31 and the network interface 33, to control the storage module 31 and the network interface 33 and execute an access control program 34. The access control program 34 is configured for determining whether a user have an access permission corresponding to a certain file 71 (described in detail later). The access control server 3 may be implemented by one or more servers. In some embodiments, the access control server 3 may be located in a file system 4.

Figure 3:
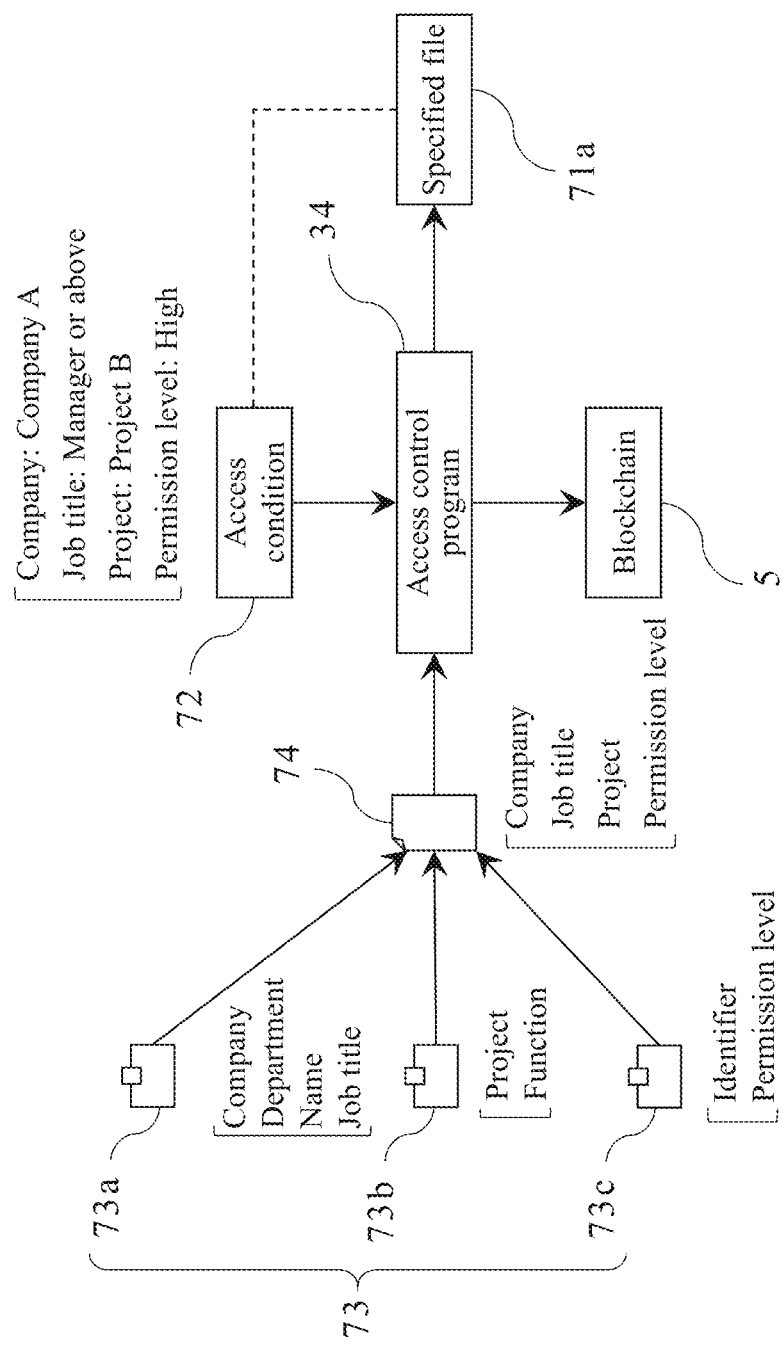
FIG. 3 is a schematic diagram of multi-credential access control according to an embodiment of the present disclosure.

Referring to FIG. 3, FIG. 3 is a schematic diagram of multi-credential access control according to an embodiment of the present disclosure. A storage module 31 stores at least one condition setting file (not shown in the figure). The condition setting file records at least one access condition 72. Each file 71 corresponds to an access condition 72. In response to the file 71 being stored in a file system 4, the access control server 3 records a corresponding access condition 72 in the condition setting file. The access condition 72 is based on all or part of attribute fields in one or more credentials 73. A user needs to issue sufficient credentials 73 and meet all access conditions 72, so that an access permission of a corresponding file 71 is obtained.

When the user wants to access a specified file 71a of the at least one file 71 stored in the file system 4, a front-end program 1 transmits an access request corresponding to the specified file 71a to the access control server 3. After the access control server 3 receives the access request through a network interface 33, the processor 32 executes the access control program 34 in response to the access request. The access control program 34 obtains the access condition 72 corresponding to the specified file 71a from the condition setting file, and transmits a check rule message including the access condition 72 to the front-end program 1 through the network interface 33. The check rule message lists the access condition 72 corresponding to the specified file 71a. The front-end program 1 extracts attribute data corresponding to the access condition and definition file identifiers (IDs) of the credentials 73a, 73b, and 73c from the credentials 73a, 73b, and 73c based on the check rule message, and integrates the attribute data extracted from the credentials 73a, 73b, and 73c with the definition file IDs to form a multi-credential proof file 74. The multi-credential proof file 74 is returned to the access control server After the access control server 3 receives the multi-credential proof file 74 through the network interface 33, and the access control program 34 queries the blockchain 5 for the credential definition file and the first public key corresponding to each of the definition file IDs in the multi-credential proof file 74, so as to confirm, based on each obtained credential definition file and each obtained first public key, that each piece of the attribute data in the multi-credential proof file 74 is correct. Specifically, each definition file write record is queried based on each definition file ID, so as to obtain the content of the credential definition file corresponding to the multi-credential proof file 74. The blockchain 5 is queried for the first public key of each issuing unit 6 by using an issuer DID in each definition file. It is confirmed based on the corresponding credential definition file that the attribute field of each piece of attribute data in the multi-credential proof file 74 is correct, and an electronic signature of each piece of attribute data in the multi-credential proof file 74 is decrypted based on the corresponding first public key. If the electronic signature can be decrypted correctly, it is confirmed that the attribute data is correct. Then the access control program 34 confirms whether all attribute data in the multi-credential proof file 74 meets the access condition 72. If so, the front-end program 1 is granted the access permission of the specified file 71*a*. The front-end program 1 is allowed to access the specified file 71*a* in the file system 4 after obtaining the access permission of the corresponding specified file 71*a*. In some embodiments, a manner of confirming whether the access condition 72 is met may be using a predicate algorithm of zero-knowledge proofs, to prove that a numerical value of the attribute data is greater than, equal to, or less than a conditional requirement without revealing actual attribute data.

In an example shown in FIG. 3, the access conditions of the specified file 71*a* include: (1) Company: Company A; (2) Job title: Manager or above; (3) Project: Project B; (4) Permission level: High. In other words, the user needs to meet the foregoing four conditions (that is, the user works in company A, the user has a job title of manager or above, the user is a member of project B, and the user has a high permission level), and then is allowed to access the specified file 71*a*. The front-end program 1 respectively extracts the attribute data corresponding to the access condition and the definition file IDs of the credentials 73*a*, 73*b*, and 73*c* from the credentials 73*a*, 73*b*, and 73*c* based on the check rule message. In this example, the credential 73*a* is an employee credential, the credential 73*b* is a project credential, and the credential 73*c* is a confidential level credential. Such credentials 73*a*-73*c* may be issued and canceled by a same issuing unit 6 or different issuing units 6. Since the front-end program 1 extracts at least one piece of attribute data from each of the credentials 73*a*, 73*b*, and 73*c*, the multi-credential proof file 74 includes the attribute data and the definition file ID of each of the credentials 73*a*, 73*b*, and 73*c*. The definition file write record of the credential definition file in the blockchain 5 is linked to the issuer DID (because the credential definition file includes the issuer DID). However, in some embodiments, if no attribute data is extracted from one or some of the credentials 73 to the multi-credential proof file 74, the definition file ID of the one or some of the credentials 73 does not need to be stored into the multi-credential proof file 74.

In some embodiments, the attribute data stored into the multi-credential proof file 74 does not need to be the same as the content of the attribute data recorded in the credential 73, but may be converted through deduction into substitution information that may be configured for determining whether the conditions are met. For example, the access condition includes a check rule of being over 18 years old. The front-end program 1 generates a proof value by using the predicate algorithm of zero-knowledge proofs when generating the multi-credential proof file 74, and incorporates the proof value into the multi-credential proof file 74. The access control server 3 may determine that the proof is true through reverse calculation using the predicate algorithm. Therefore, birthday data in the credential 73 does not need to be written, so as to avoid revealing personal privacy information.

In some embodiments, after the access control server 3 obtains a user DID from the credential 73, the user DID is used to obtain a public key of a corresponding user (that is, a second public key) from the blockchain 5, and data returned to the user is encrypted with the second public key. In this way, it can be ensured that only the user can decrypt and read the data with a second private key kept by the user, thereby enhancing confidentiality of a file.

In some embodiments, the front-end program 1 executes the electronic signature on the multi-credential proof file 74 by using the second private key to which the user DID belongs included in the credential 73. The access control server 3 may obtain the second public key of the user DID from the blockchain 5 to verify the electronic signature, so as to confirm that a person who transmits the multi-credential proof file 74 is indeed the user.

In some embodiments, the file system 4 is an interplanetary file system (IPFS). The IPFS is a peer-to-peer distributed file system. A content identifier (CID) is an index value configured for pointing to a content stored in the IPFS. Unlike a conventional file path, the CID does not indicate a storage location of the content, but is a unique identifier calculated based on data content, and the file system queries and reads the data based on the identifier. Specifically, the CID is a multi-hash value generated by encrypting and hashing the data and adding some self-description data to the encrypted and hashed data. The file is first cut into fragmented files when being stored in the IPFS. Each fragmented file has a CID. The CIDs of these fragmented files are linked based on Merkle directed acyclic graphs, and finally, a root CID may be calculated. The root CID is the CID of the stored data file.

Figure 4:
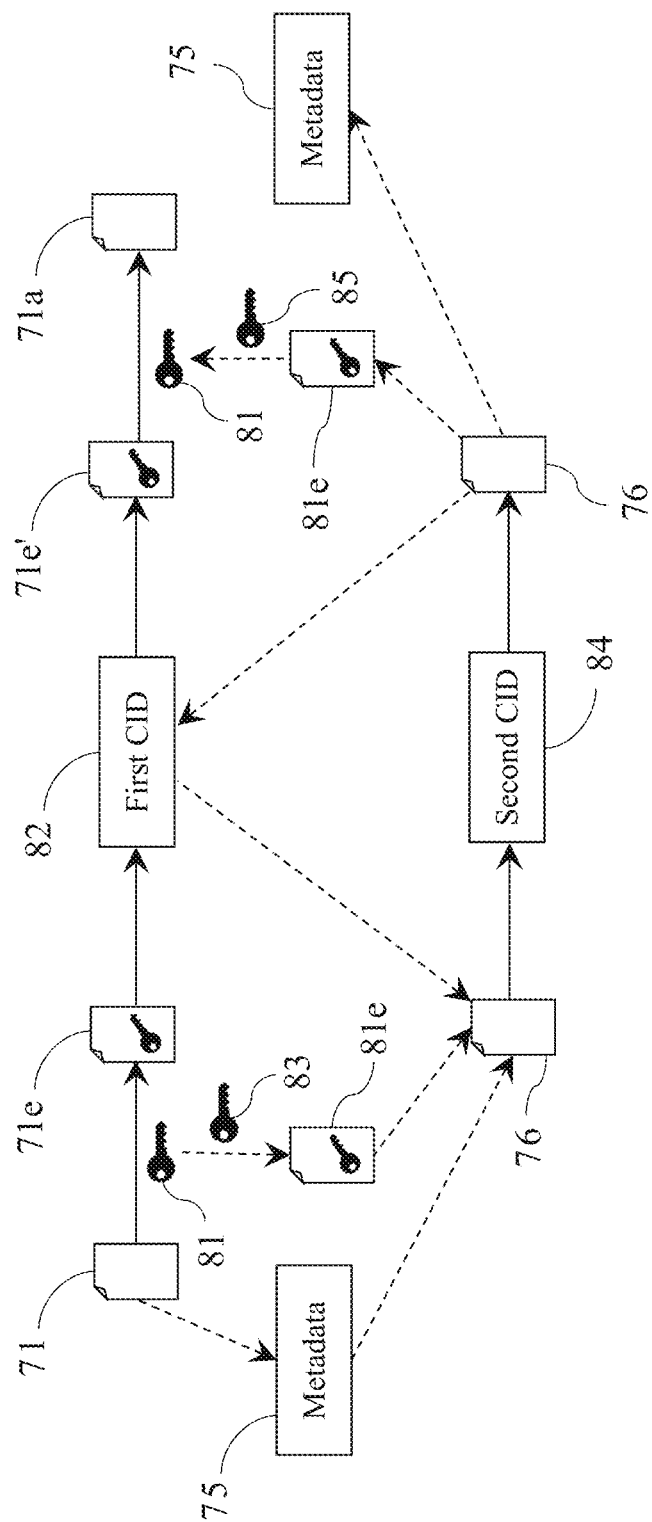
FIG. 4 is a schematic diagram of access of an interplanetary file system (IPFS) according to an embodiment of the present disclosure.

Referring to FIG. 4, FIG. 4 is a schematic diagram of access of an IPFS according to an embodiment of the present disclosure. Before each file 71 is stored in the IPFS, the file is encrypted by a symmetric key 81 randomly generated by an access control server 3 by using a symmetric encryption algorithm (such as AES, ChaCha20, and 3DES). The symmetric key 81 corresponding to each file 71 is not the same. The IPFS stores an encrypted file 71*e* and correspondingly generates a first CID 82.

Next, a separate security system (such as a hardware security module (HSM) and a key management service (KMS)) is used to generate one or more key pairs based on asymmetric encryption: a third public key 83 and a third private key 85. The third private key 85 is stored in the security system, and the access control server 3 encrypts the symmetric key 81 by using the third public key 83 to generate symmetric key ciphertext 81*e*. The access control server 3 edits the first CID 82, the symmetric key ciphertext 81*e*, and metadata 75 of the corresponding file 71 into a file identification file 76. The metadata 75 may include, but is not limited to, a file format, a file name, and a timestamp (such as a file creation time) of the corresponding file. The IPFS stores the file identification file 76 and correspondingly generates a second CID 84. The access control server 3 associatively stores descriptive data of the second CID 84 and the file 71 (including but not limited to at least one of information such as the file name, the timestamp, and a file size) in the blockchain 5.

After the front-end program 1 obtains the access permission of the specified file 71a in the IPFS, the access control server 3 queries the blockchain 5 for the corresponding second CID 84 based on the descriptive data of the specified file 71a, to obtain the file identification file 76 from the IPFS based on the second CID 84, and read the first CID 82, the symmetric key ciphertext 81e, and the metadata 75 from the file identification file 76. The symmetric key ciphertext 81e is restored through the third private key 85 to obtain the symmetric key 81. The access control server 3 obtains an encrypted specified file 71e' from the IPFS by using the first CID 82, and decrypts the encrypted specified file 71e' by using the restored symmetric key 81 to restore the specified file 71a. Finally, the access control server 3 provides the specified file 71a and the metadata 75 to the front-end program 1. A user device 2 may learn a file format of the specified file 71a through the metadata 75, so as to enable a proper application program to open the specified file 71a.

In some embodiments, the access control server 3 encrypts transmitted data based on a user public key (that is, the foregoing second public key) corresponding to the user DID and then transmits the specified file 71a and the metadata 75 to the front-end program 1, to ensure that the transmitted data can only be decrypted and read by a user by using the second private key kept by the user, thereby enhancing confidentiality.

Figure 5:
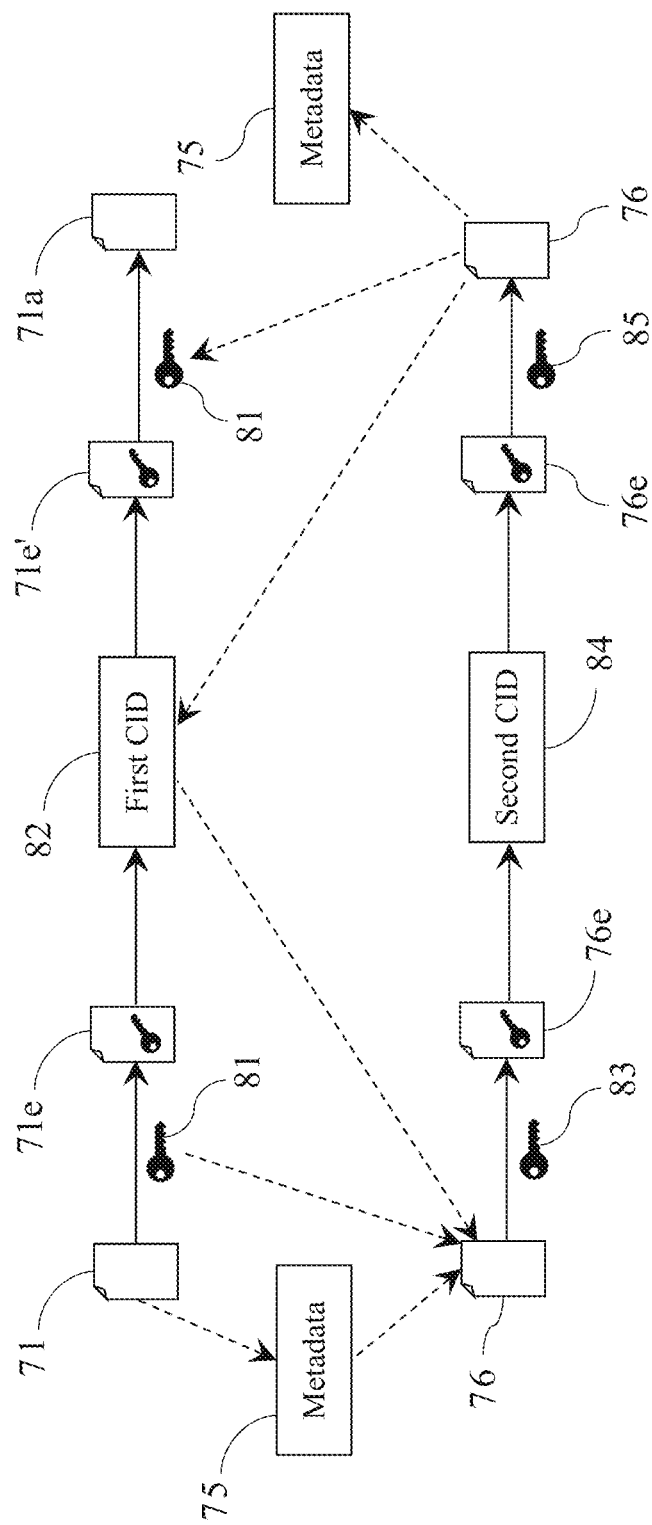
FIG. 5 is a schematic diagram of access of an IPFS according to another embodiment of the present disclosure.

Referring to FIG. 5, FIG. 5 is a schematic diagram of access of an IPFS according to another embodiment of the present disclosure. A main difference is that the third public key 83 of the embodiment in FIG. 4 is used to encrypt the symmetric key 81, and the third public key 83 of this embodiment is used to encrypt the file identification file 76. Specifically, in the embodiment of FIG. 4, the symmetric key 81 is first encrypted with the third public key 83 to generate the symmetric key ciphertext 81e, and then the symmetric key ciphertext 81e, the first CID 82, and the metadata 75 are edited into the file identification file 76. Therefore, the file stored in the IPFS is the identification file 76. In this embodiment, the first CID 82, the symmetric key 81, and the metadata 75 are first edited into the file identification file 76, and then the file identification file 76 is encrypted by using the third public key 83 to form an encrypted file identification file 76e. Therefore, the file stored in the IPFS is the encrypted file identification file 76e. Correspondingly, in this embodiment, the encrypted file identification file 76e is obtained from the IPFS based on the second CID 84, and after the encrypted file identification file 76e is decrypted by using a corresponding third private key 85 and then the file identification file 76 is obtained to restore the first CID 82, the symmetric key 81, and the metadata 75. Only a part that is different from the embodiment in FIG. 4 is specifically described herein, and the content not specifically mentioned is the same as the embodiment of FIG. 4 and is not repeated.

Based on the above, according to the system for decentralized identification of a file access permission in some embodiments of the present disclosure, the credential 73 is used to confirm the access permission of the user to avoid a risk of fraudulent use and theft that may be caused by use of the account and password, and validity of the credential 73 is managed and controlled to facilitate management of the access permission of the user. Since the credential 73 is kept by the user, privacy may be kept, thereby avoiding a risk of exposing personal information caused by storage of the credential 73 in the blockchain 5, and information cannot be deleted once stored in the blockchain 5. Therefore, an attribute of the personal information is not shared by the blockchain 5, but is preserved in a personal/private communication channel of the user. The information stored into the blockchain 5 by the present disclosure is the DID, the public key, and the credential definition file, and disclosure of such information does not involve personal information content of the user. According to another aspect, in some embodiments, the file 71 is encrypted in advance and then stored in the IPFS, so that a problem of lack of encryption protection due to the file 71 in the IPFS being open to a node may be resolved. Moreover, since the file 71 is fragmented when stored in the IPFS, a format of an original file 71 cannot be identified after reorganization and restoration. If the file format is not learned in advance, the file cannot be normally opened. The metadata 75 of the file 71 is stored in the IPFS, so as to resolve the problem that the file format cannot be identified. In addition, the access control server 3 may encrypt the file 71 with the public key to which the user DID belongs when transmitting the file to the front-end program 1, to ensure that the file 71 may only be read by an authorized user.

What is claimed is:

1. A system for decentralized identification of a file access permission, comprising:
   a front-end program, comprising at least one credential, wherein the at least one credential comprises a definition file identifier (ID) and at least one piece of attribute data; and
   an access control server, communicatively connected to a file system and a blockchain, wherein the file system stores at least one file, and the access control server comprises:
      a storage module, storing at least one condition setting file, wherein the condition setting file records at least one access condition, and each of the files corresponds to one of the at least one access condition;
      a network interface, configured to receive an access request that is transmitted by the front-end program and corresponds to a specified file of the at least one file; and
      a processor, coupled to the storage module and the network interface, and in response to the access request, obtaining the access condition corresponding to the specified file from the at least one condition setting file, and transmitting a check rule message comprising the access condition to the front-end program through the network interface, wherein
      the front-end program is configured for extracting the at least one piece of attribute data and the definition file ID corresponding to the access condition from the at least one credential based on the check rule message, to form a multi-credential proof file, and returning the multi-credential proof file to the access control server; and
      the access control server is configured to receive the multi-credential proof file through the network interface, and the processor is configured to query the blockchain for a credential definition file and a first public key corresponding to each of the definition file IDs in the multi-credential proof file through the network interface, so as to confirm, based on each obtained credential definition file and each obtained first public key, that each piece of the attribute data in the multi-credential proof file is correct, confirm that all of the attribute data in the multi-credential proof file meets the access condition, and then grant the front-end program an access permission corresponding to the specified file.

2. The system for decentralized identification of a file access permission according to claim 1, wherein each piece of the attribute data in the multi-credential proof file is encrypted through a first private key corresponding to the corresponding first public key to generate an electronic signature, and the electronic signature of each piece of the attribute data in the multi-credential proof file is decrypted based on the corresponding first public key to confirm that each piece of the attribute data is correct.

3. The system for decentralized identification of a file access permission according to claim 1, wherein the at least one credential further comprises a user decentralized identifier (DID), and the front-end program further comprises a second private key.

4. The system for decentralized identification of a file access permission according to claim 3, wherein the blockchain further associatively stores the user DID and a second public key corresponding to the second private key.

5. The system for decentralized identification of a file access permission according to claim 4, wherein the access control server is configured to obtain the corresponding second public key from the blockchain based on the user DID in the at least one credential before transmitting a piece of data to the front-end program, and encrypt the data by using the second public key.

6. The system for decentralized identification of a file access permission according to claim 1, wherein the credential definition file is written to the blockchain to form a definition file write record, and an electronic signature is executed on the definition file write record through a first private key corresponding to the first public key.

7. The system for decentralized identification of a file access permission according to claim 1, wherein the access control server is configured to query the blockchain for the credential definition file and the first public key corresponding to each of the definition file IDs in the multi-credential proof file.

8. The system for decentralized identification of a file access permission according to claim 1, wherein the blockchain further associatively stores an issuer decentralized identifier (DID) and a uniform resource identifier (URI) corresponding to the issuer DID.

9. The system for decentralized identification of a file access permission according to claim 1, wherein the front-end program generates a master secret value, and the master secret value is subjected to blinded encryption and then added to the at least one credential.

10. The system for decentralized identification of a file access permission according to claim 1, wherein a manner of confirming whether the access condition is met is using a predicate algorithm of zero-knowledge proofs.

11. The system for decentralized identification of a file access permission according to claim 1, wherein the file system is an interplanetary file system (IPFS), each of the files is encrypted by a randomly generated symmetric key and then stored in the IPFS, and the IPFS stores the encrypted file and correspondingly generates a first content identifier (CID).

12. The system for decentralized identification of a file access permission according to claim 11, wherein the symmetric key is encrypted by a third public key in a key pair generated through asymmetric encryption and generates symmetric key ciphertext, the symmetric key ciphertext, the first CID, and a piece of metadata corresponding to the file are written to a file identification file, and the IPFS stores the file identification file and correspondingly generates a second CID.

13. The system for decentralized identification of a file access permission according to claim 12, wherein the metadata comprises a file format, a file name, and a timestamp corresponding to the specified file.

14. The system for decentralized identification of a file access permission according to claim 12, wherein the second CID and a piece of descriptive data corresponding to the file are associatively stored in the blockchain, and after the front-end program obtains the access permission of the specified file, the access control server is configured to query the blockchain for the corresponding second CID based on the descriptive data of the specified file, to obtain the file identification file from the IPFS based on the second CID, and read the first CID, the symmetric key ciphertext, and the metadata from the file identification file, wherein the symmetric key ciphertext is decrypted by a third private key corresponding to the third public key to restore the symmetric key.

15. The system for decentralized identification of a file access permission according to claim 14, wherein the access control server is configured to obtain an encrypted specified file from the IPFS based on the first CID read from the file identification file, and decrypt the encrypted specified file by using the restored symmetric key and provide the decrypted specified file to the front-end program.

16. The system for decentralized identification of a file access permission according to claim 14, wherein the metadata read from the file identification file is provided to the front-end program.

17. The system for decentralized identification of a file access permission according to claim 11, wherein the first CID, the symmetric key, and a piece of metadata corresponding to the file are written to a file identification file, the file identification file is encrypted by a third public key of a key pair generated through asymmetric encryption and stored in the IPFS, and the IPFS correspondingly generates a second CID.

18. The system for decentralized identification of a file access permission according to claim 17, wherein the second CID and a piece of descriptive data corresponding to the file are associatively stored in the blockchain, and after the front-end program obtains the access permission of the specified file, the access control server is configured to query the blockchain for the corresponding second CID based on the descriptive data of the specified file, to obtain an encrypted file identification file from the IPFS based on the second CID, and wherein the encrypted file identifier is decrypted by a third private key in the corresponding key pair to restore the first CID, the symmetric key, and the metadata.

19. The system for decentralized identification of a file access permission according to claim 18, wherein the access control server is configured to obtain an encrypted specified file from the IPFS based on the restored first CID, and decrypt the encrypted specified file by using the restored symmetric key and provide the decrypted specified file to the front-end program.

20. The system for decentralized identification of a file access permission according to claim 18, wherein the restored metadata is provided to the front-end program.

* * * * *